United States Patent
Kliger et al.

(10) Patent No.: US 10,764,299 B2
(45) Date of Patent: Sep. 1, 2020

(54) ACCESS CONTROL MANAGER

(71) Applicant: Microsoft Technology Licensing, LLC, Redmond, WA (US)

(72) Inventors: Ben Kliger, Ramat-Gan (IL); Efim Hudis, Bellevue, WA (US); Moshe Israel, Ramat-Gan (IL); Steven J. Lieberman, Redmond, WA (US); Mark Wahl, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 15/637,410

(22) Filed: Jun. 29, 2017

(65) Prior Publication Data
US 2019/0007415 A1    Jan. 3, 2019

(51) Int. Cl.
*H04L 29/06* (2006.01)
*G06F 21/50* (2013.01)
*G06F 21/60* (2013.01)

(52) U.S. Cl.
CPC ............ *H04L 63/104* (2013.01); *G06F 21/50* (2013.01); *G06F 21/604* (2013.01); *H04L 63/101* (2013.01); *H04L 63/0263* (2013.01); *H04L 63/10* (2013.01); *H04L 63/102* (2013.01)

(58) Field of Classification Search
CPC . H04L 63/104; H04L 63/101; H04L 63/0263; H04L 63/10; H04L 63/102
See application file for complete search history.

(56) References Cited

U.S. PATENT DOCUMENTS

| | | | |
|---|---|---|---|
| 6,202,066 B1* | 3/2001 | Barkley | G06F 21/6218 707/785 |
| 8,141,138 B2 | 3/2012 | Bhatia et al. | |
| 8,327,419 B1* | 12/2012 | Korablev | G06F 21/6218 707/728 |
| 9,516,504 B2 | 12/2016 | Schmitt | |
| 2003/0046576 A1* | 3/2003 | High, Jr. | H04L 63/20 726/1 |
| 2003/0079136 A1* | 4/2003 | Ericta | H04L 63/101 713/185 |
| 2003/0229623 A1* | 12/2003 | Chang | G06F 21/6218 |

(Continued)

FOREIGN PATENT DOCUMENTS

| | | |
|---|---|---|
| WO | 0214989 A2 | 2/2002 |
| WO | 2006131906 | 12/2006 |
| WO | 2017052827 A1 | 3/2017 |

OTHER PUBLICATIONS

"International Search Report and Written Opinion Issued in PCT Application No. PCT/US18/035241", dated Aug. 10, 2018, 12 Pages.

(Continued)

*Primary Examiner* — Techane Gergiso
(74) *Attorney, Agent, or Firm* — Dicke, Billig & Czaja, PLLC

(57) ABSTRACT

An access configuration for an access control manager is generated. Access data including users, resources, and actions the users performed on the resources is received into a matrix. Clusters of the matrix are formed to produce ranges of the users and ranges of the resources having selected permission levels based on the actions. Administrator-modifiable security groups are created based on the ranges of users and administrator-modifiable resources groups based on the ranges of resources.

20 Claims, 4 Drawing Sheets

(56) References Cited

U.S. PATENT DOCUMENTS

| | | |
|---|---|---|
| 2005/0138419 A1 | 6/2005 | Gupta et al. |
| 2006/0277184 A1 | 12/2006 | Faitelson et al. |
| 2007/0073894 A1* | 3/2007 | Erickson ................ H04L 41/12 |
| | | 709/230 |
| 2010/0146584 A1 | 6/2010 | Haswarey et al. |
| 2013/0080641 A1* | 3/2013 | Lui ........................ H04L 67/10 |
| | | 709/226 |
| 2013/0132854 A1* | 5/2013 | Raleigh ................ G06F 3/0482 |
| | | 715/738 |
| 2013/0291062 A1* | 10/2013 | Bursell .................. G06F 21/44 |
| | | 726/4 |
| 2014/0033267 A1 | 1/2014 | Aciicmez |
| 2014/0129273 A1* | 5/2014 | Versteeg ........... G06F 17/30286 |
| | | 705/7.14 |
| 2014/0196104 A1* | 7/2014 | Chari ..................... H04L 63/20 |
| | | 726/1 |
| 2014/0196115 A1* | 7/2014 | Pelykh ................... H04L 63/08 |
| | | 726/4 |
| 2014/0282586 A1* | 9/2014 | Shear .................... G06F 9/5072 |
| | | 718/104 |
| 2015/0256526 A1* | 9/2015 | Biegala ................. H04L 63/20 |
| | | 726/6 |
| 2016/0034305 A1* | 2/2016 | Shear ....................... G06F 9/50 |
| | | 707/722 |
| 2016/0182527 A1* | 6/2016 | Lietz .................... H04L 63/105 |
| | | 726/6 |
| 2016/0267413 A1* | 9/2016 | Liang ................... G06F 21/604 |
| 2016/0294881 A1* | 10/2016 | Hua ........................ H04L 63/20 |
| 2016/0335118 A1* | 11/2016 | Beiter ..................... G06F 9/468 |
| 2017/0104688 A1* | 4/2017 | Mirahsan ............ H04L 12/4641 |
| 2017/0111365 A1* | 4/2017 | Michael ................ H04L 63/102 |
| 2017/0201850 A1* | 7/2017 | Raleigh ................... H04W 4/50 |
| 2017/0295186 A1* | 10/2017 | Movsisyan ........... H04L 63/102 |
| 2017/0339156 A1* | 11/2017 | Gupta ................. G06F 21/6218 |
| 2018/0288064 A1* | 10/2018 | Ross ................. G06F 17/30867 |

OTHER PUBLICATIONS

"AWS Identity and Access Management", http://docs.aws.amazon.com/IAM/latest/UserGuide/iam-ug.pdf, Published on: Dec. 12, 2016, 616 pages.

Warang, et al., "Role Based Access Control Model for Cloud Computing Using RBE Scheme", In International Journal of Advanced Research in Computer Science and Software Engineering, vol. 6, Issue 10, Oct. 2016, pp. 109-114.

* cited by examiner

ACCESS CONTROL MANAGER

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage and resources for applications.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Organizations often segment access to its resources, such as resources and assets of a deployed in a cloud environment, via user permissions implemented in identity and access management services. Too much access leaves the resources vulnerable to attack whereas too little access prevents users from efficiently performing their tasks. Identity and access management services—such as Role Based Access Control, Identity Access Management, or other services including security services—attempt to address this problem by providing fine-grained access permissions for users to the resources of an organization. In order to employ an identity and access management services, an organization defines permissions for its users for each of its applicable resources. Lists of these permissions can become complicated and difficult to manage as users are added, leave, or change roles within the organization and the number of resources grows. As a practical matter, the management of user access to resources is complicated and the permissions are not properly maintained.

An access configuration with recommended permission levels for an access control manager is generated. Access data including a users, resources, and actions the users performed on the resources is received into a matrix. In one example, the actions are transformed into a recommended permission level from a set of possible permission levels. Clusters of the matrix are formed to produce ranges of the users and ranges of the resources having selected permission levels based on the actions. In one example, the clusters are formed via biclustering to generate a set of ranges of users and a set of ranges of resources. Administrator-modifiable security groups are created based on the ranges of users and administrator-modifiable resources groups based on the ranges of resources. In one example, permission levels from the security groups and resources groups are automatically deployed into the access control manager.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
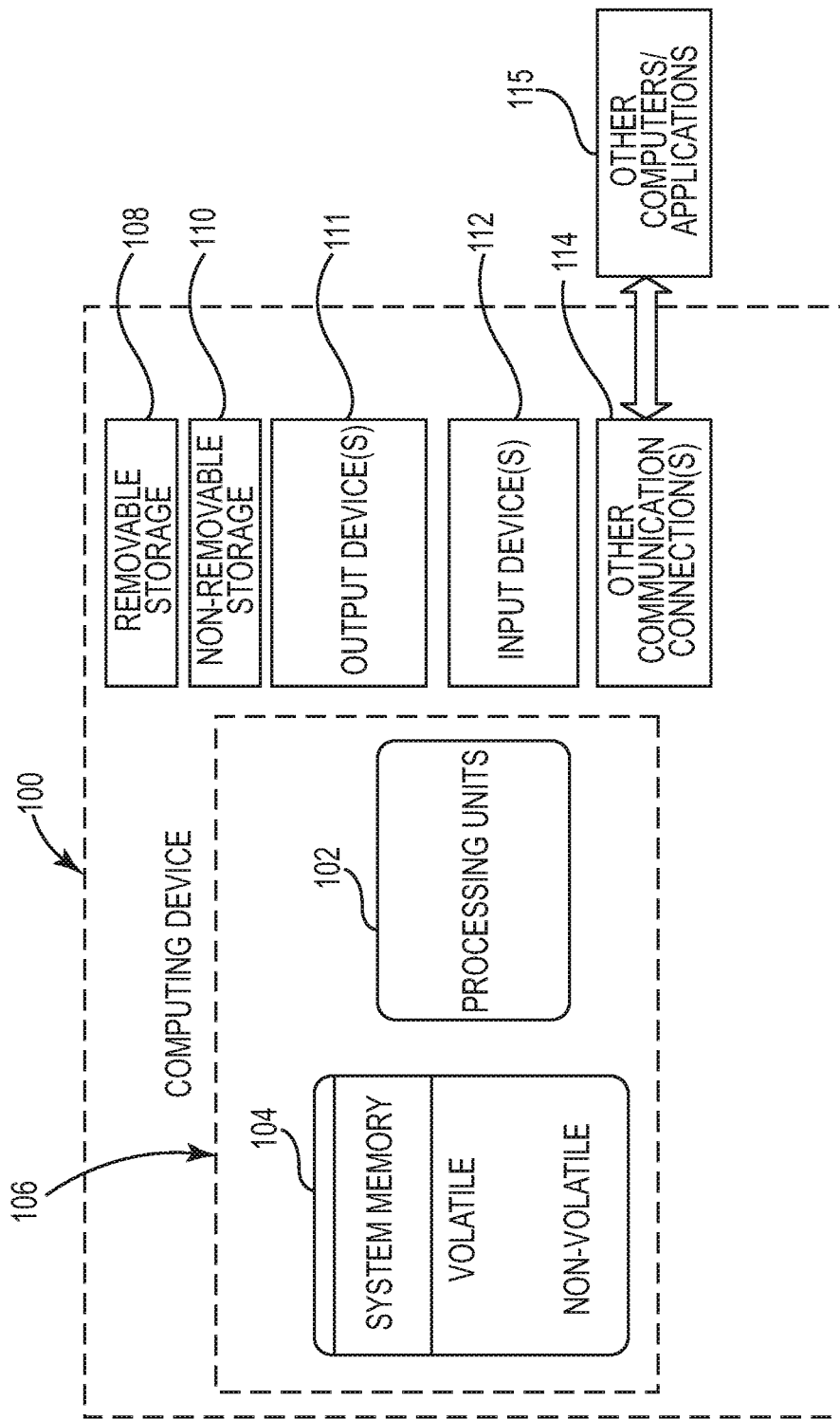
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, a one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible, distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices.

Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform.

Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment.

In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
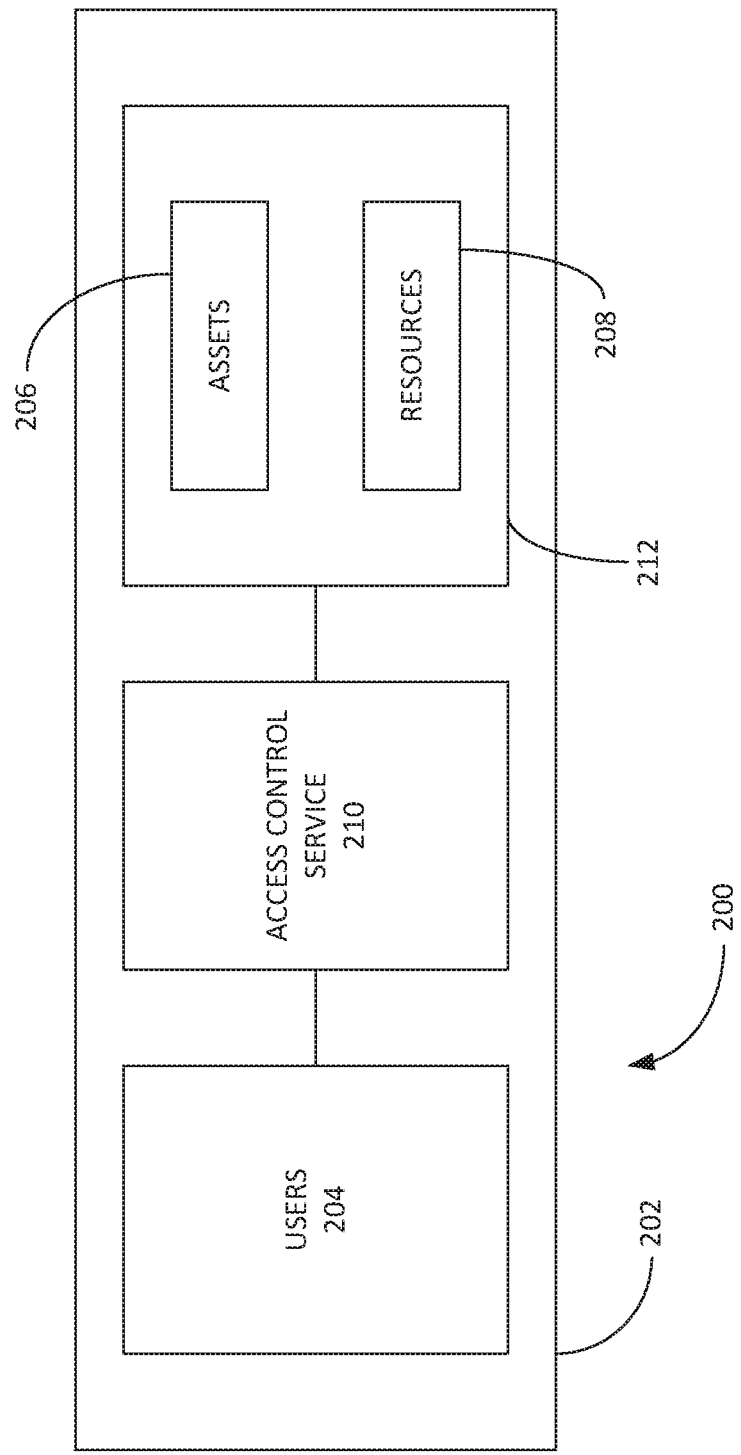
FIG. 2 is a schematic diagram illustrating an example a cloud-computing environment.

FIG. 2 illustrates an example a cloud-computing environment 200, such as a public cloud, to deploy applications and data on a platform and infrastructure across selected datacenters. In the illustrated example, the environment 200 can provided capability to a cloud tenant, such as one or more cloud tenants 202, each with multiple users 204 to deploy assets 206 and resources 208 in the cloud environment 200. Users 204 can include operators, employees, subscribers, customers or other groups or individuals of the cloud tenant 202 or associated with the cloud tenant 202. Assets 206 can include applications, documents, and data that can be deployed to the cloud computing environment 200 and address infrastructure issues. The environment 200 includes, or includes access to, resources 208 available from one or more resource providers. A resource 208 can include a component of the application to be provisioned in a platform subscription and provides an item of the platform solution. Examples of resources 206 can include virtual machines, databases, virtual networks, and others. Resources 206 can be user-managed entities, entities automatically managed by a platform with the cloud environment 200, or a combination of user-managed and automatically managed entities. Resource providers include services that provide resources for the cloud-based assets 204. Resource providers include services to create, configure, and manage operations for working with the resource 206. Examples of resource providers include a compute provider to supply a virtual machine resource, storage provider to supply a storage account resource, web provider to supply resources related to web applications, and other resource providers.

Cloud environment 200 also includes an access control service 210 to securely control user access to the assets 206 and resources 208. One layer of the access control service 210 permits authorized user access to the assets 206 and resources 208. Another layer of the access control service 210 provides each authorized user 204 with a particular permission level for each applicable asset 206 and resource 208, such as with a Role Based Access Control, or RBAC, manager. For example, the access control service 210 can provide for the creation of resource groups of the assets 206 and resources 208 and provide select user access to the resource group via an assigned user permission from a set of user permissions. For illustrative purposes, resources 212 can include both cloud-based assets 206 and resources 208.

An example access control service 210 can include a resource manager. The resource manager can include a container to hold a logical grouping of resources, such as related resources, to support a particular application or workload as a resource group. A resource group may include resources that share the same management lifecycle. A resource group can be created to scope access control for administrative actions, and resources can interact with resources from other resource groups. Resource groups provide an integrated mechanism to manage the application resources in the cloud environment 200.

Access control service 210 can selectively assign a permission level from a set of permission levels to each authorized user for each resource in the cloud environment 200. An example of a set of permission levels for a resource implemented with the access control service 210 can include a write permission and a read permission. For instance, a user with a write permission to a resource has the ability to read and to modify the resource, and a user with a read permission has the ability to read but does not have the ability to modify the resource. Another example set of permission levels includes ownership, contributor, and reader. A user with an ownership permission has full permission to modify the resource and delegate permissions to other users, a user with a contributor permission has the ability to modify a resource but does not have the ability not to grant permissions to other users, and a user with a read permission can access the resource but does not have the ability to modify the resource or grant permissions to others. Each of the sets of permission levels can also include a no access permission in which a user does not have the ability to access the resource. Other example sets of permission levels are contemplated.

Figure 3:
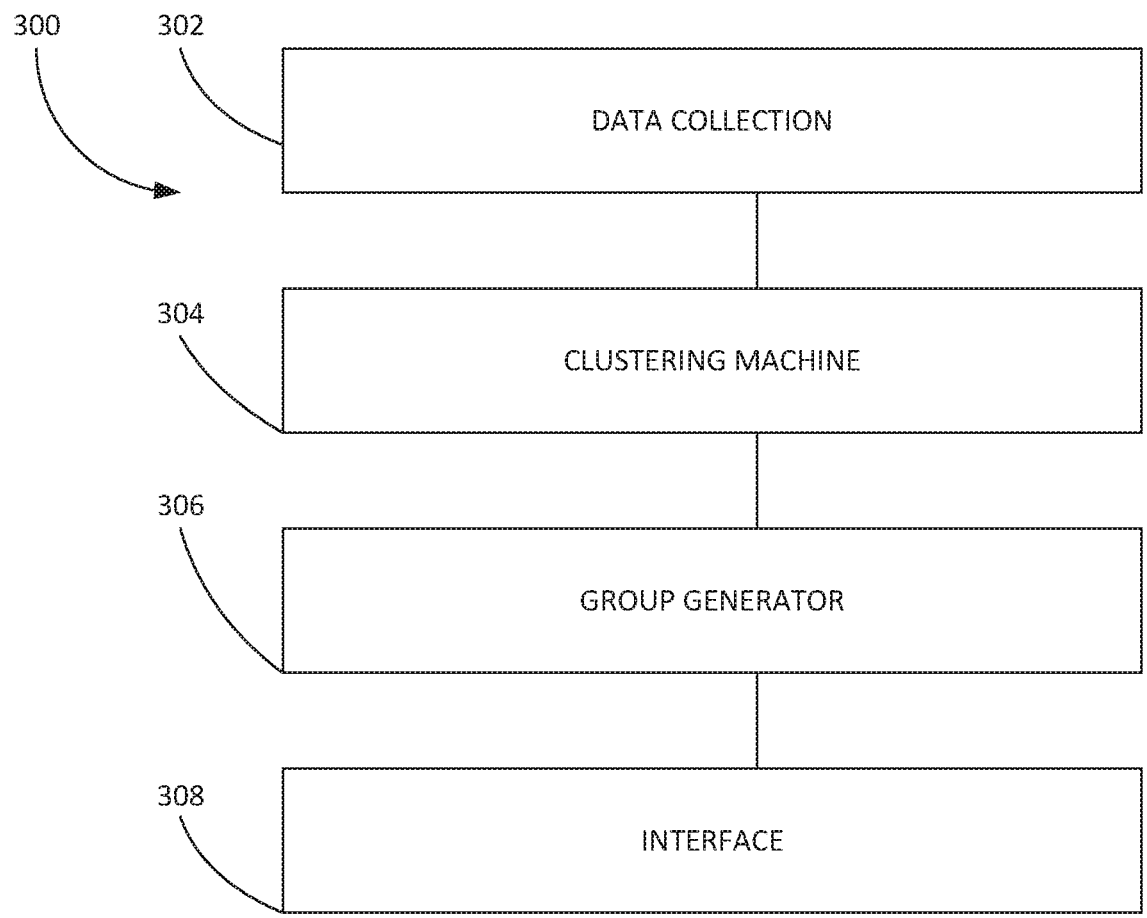
FIG. 3 is a schematic diagram illustrating an example access control configuration manager, which can be included as a service in the cloud computing environment of FIG. 2.

FIG. 3 illustrates an example access control configuration manager 300, which, in one example, can be implemented with an access control service 210. Access control configuration manager can be applied to automatically create and maintain configurations of a proposed permissions policy including groups of resources 212, groups of users 204 of the same permission level of a set of permission levels, and connections between the users 204 and resources 212. The configurations can be presented to an administrator who can decide whether change some or all of the proposed permissions policy or approve some or all of the proposed permissions policy. In one example, access control configuration manager 300 can be implemented as part of an infrastructure or platform as a service such as for a cloud tenant 202. In another example, access control configuration manager 300 can be implemented as a software as a service such as for subscribers in other clouds, hybrid clouds, or private networks.

Access control configuration manager 300 includes a component to collect data regarding user access of resources 302. For example, data collection component 302 can be configured to retrieve data from access logs of the access control service 210 or other stores of data regarding user 204 access of resources 212 for a given time period. A clustering machine 304 receives the data from data collection component 302, and generates clusters of users 204 and resources 212 with same permission levels. The clustering machine 304 can include a biclustering machine. A group generator 306 is coupled to the clustering machine 304 to create security entities from the clusters. For example, the group generator 306 can create a security group that includes a list of users 204 and a resources group that includes lists of resources 212. The group generator 306 can create recommended permission levels for the users 204 to access resources 212. An administrator interface component 308 presents the recommended permission levels to an administrator, who can apply features of the administrator interface component 308 to selectively modify or accept the recommended permission levels for the users 204 and resources 212 and deploy the permission levels into an RBAC manager or other feature of the access control service 210.

Figure 4:
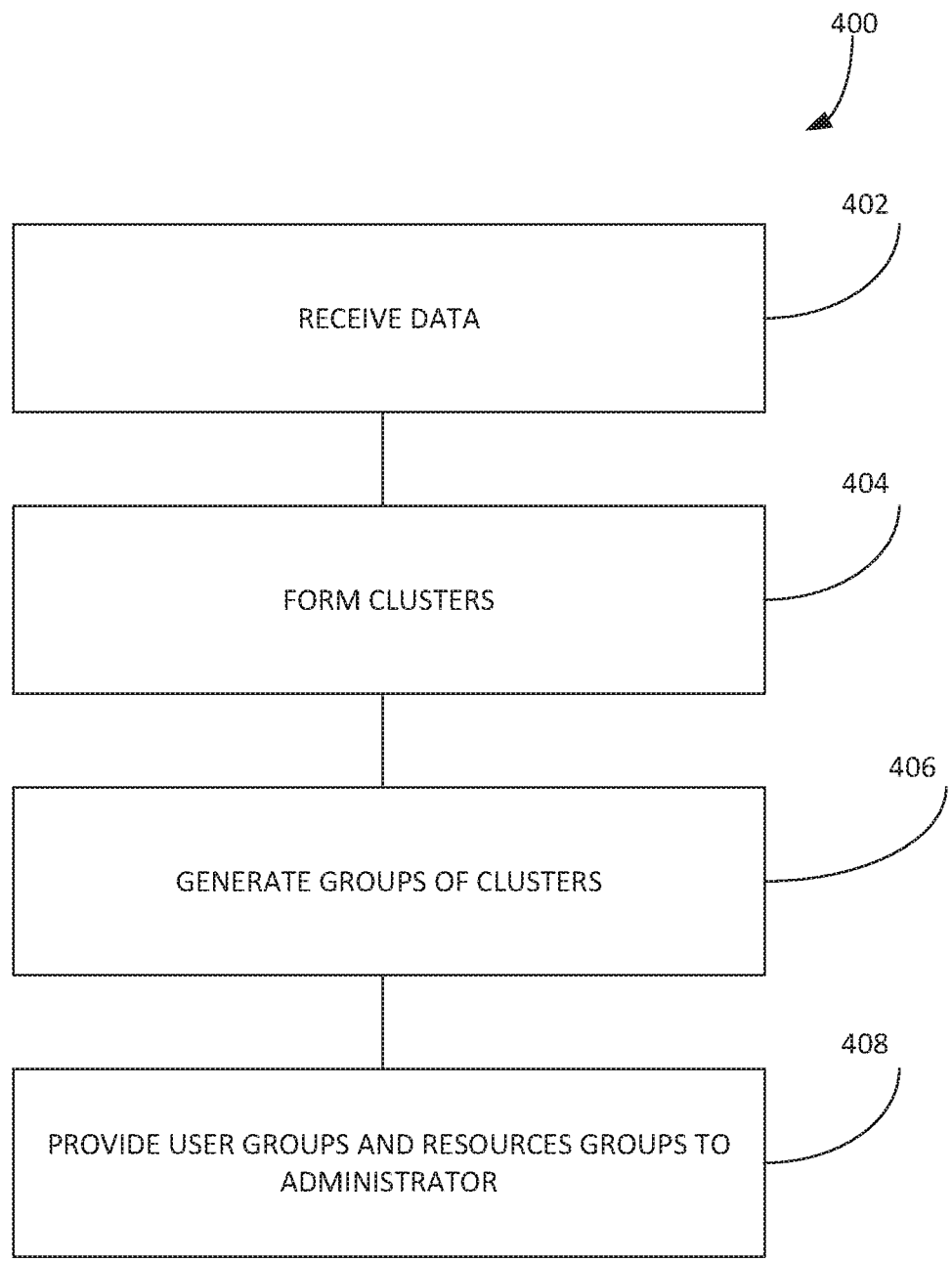
FIG. 4 is a block diagram illustrating an example method of the access control configuration manager of FIG. 3.

FIG. 4 illustrates an example method 400 for use with the access control configuration manager 300. In the example, data regarding user access of resources 212 is collected at

402, such as with the data collection component 302. In one example, data is collected from access logs that may be included in the access control service for the cloud tenant, which can be operably coupled to the user account or the resource. The collected data can include information regarding the user, the resource, and the action the user performed with the resource in a set of fields of a database. In one example, the action can represent the permission level the user applied to the resource in a particular recorded access. Example information can include "user A read resource X," "user B modified resource Y," and "user C delegated permission to users D and E for resource Z." In one example, the data can be collected over a given time period, such as the previous 48 hours, or other time period.

As part of collecting data at 402, the data regarding a set of user, resource and action can be arranged in a data structure, such as an array, stored on a computer memory device. In one example, the data can be in the form of a two-dimensional matrix, such as users 204 by resources 212, in which rows represent the users, and each column represents an action on a resource for that user.

The actions can be transformed into recommended or expected permission levels of a user for a resource in the matrix as part of collecting the data at 402. In one example, a user row may correspond with multiple actions for a given resource, such as if user A read resource X five times in the time period of interest and modified resource X once, the matrix may include each action separately. In assigning the recommended or expected permission level, the matrix may include each user 204 and each resource 212 once, and the action may correspond with the least restrictive permission level. In the example, if user A read resource X five times and modified resource once, a single row for user A and a single column for resource X would include a write-level (i.e., modify) permission, because a write permission level is less restrictive than a read permission level. In another example, the frequency of the action may be taken into account in assigning a recommend or expected permission level. For example, if user A read resource X fifty times and modified the resource just once, a single row for user A and a single column for resource X could include a read permission level, even though the read permission level is more restrictive than a write permission level, based on the typical action of that resource. Other examples of creating a matrix with users and resources and transforming actions into permission levels are contemplated.

The matrix is formed into clusters at 404, such as with clustering machine 304. In one example, the formation of clusters at 404 can be performed via biclustering, which is a data mining technique to provide clustering of rows and columns of a matrix. In general, clustering includes the task of grouping a set of objects in such a way that objects in the same group or cluster are more similar, such as similarity of action performed on a resource, to each other than to those in other groups or clusters. Biclustering forms clusters of users 204 and clusters of resources 212 having a similar permission level as determined via actions on the resources. For example, a user is assigned a read permission level for a selected resource if the least restrictive action the user performed on the selected resource was a read of the resource.

The clustering is processed to generate groups of clusters at 406, such as with group generator 306. In one example, the formation of clusters at 404 can produce ranges of one or more users 204 and ranges of one or more resources 212 with generally similar permission levels as determined via actions on the resources. For example, a range of users can include a plurality of users having a similar permission level as determined via actions. In some examples, not every user in the range includes the same permission level as determined from the biclustering technique. The ranges of users and ranges of resources are used to create groups, such as security groups of users 204 having a range of users with a similar permission levels for a resource 212 and resources groups of resources 212 having a range of resources with users having similar permission levels. In one example, a first security group can include a plurality of users 204 each having a read permission to a first range of resources, a write permission to a second range of resources, and no access to a third range of resources. In another example, a first resources group can include a plurality of resources 212 in which a first and second range of users include a write permission and a third range of users have a no access permission.

Generating the groups at 406 can create a matrix of security groups by resources groups. The security groups can represent rows of the matrix and each column of each row represents the permission level for a resources group that is assigned or recommended to that security group. In one example, a user can appear in only one security group and a resource can appear in only one resources group. In another example, a user can appear in more than one security groups and a resource can appear in more than one resources groups.

The users groups and resources groups, together with the recommended permission levels are provided to the administrator at 408, such as via the administrator interface component 308. In one example, the permission levels can be automatically deployed to the access control service 210, and may be modifiable at 408. Also, the security groups can be modified, such as one or more users can be added, removed, or permission levels changed within the security group at 408. The resources group can also be modified, such as one as one or more resources can be added, removed, or permission levels changed within the resources group at 408. Changes can be deployed to the access control service 210.

The example access control configuration manager 300 and method 400 can be implemented to include a combination of one or more hardware devices and computer programs for controlling a system, such as a computing system having a processor and memory, to perform method 400 to generate a permissions policy to configure user access to resources. For instance, access control configuration manager 300 and method 400 can be implemented as a computer readable medium or computer readable device, such as memory 104 or storage 108, 110 having set of executable instructions for controlling the processor 102 to perform the method 400. The access control configuration manager 300 and method 400 can be included as a service in a cloud environment and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:
1. A method of generating an access configuration, the method comprising:

receiving access data including a plurality of users, a plurality of resources, and actions the plurality of users performed on the plurality of resources into a matrix of the plurality of users and the plurality of resources from a data gathering over a period of time of permission levels;

assigning an expected permission level for each resource of the plurality of resources to each user of the plurality of users based on actions of the each user with respect to each resource from the access data selected from a plurality of permission levels available for access over the period of time, wherein the expected permission level is a more restrictive permission level than a least restrictive permission level of the plurality of permission levels available for access;

forming clusters of the matrix to produce a plurality of ranges of the users and a plurality of ranges of the resources from the expected permission level for each resource;

assigning a permission level from a set of permission levels to each of the clusters based on the access data of the actions, the access data of the actions corresponding with the set of the permission levels; and creating administrator-modifiable security groups based on the plurality of ranges of users and administrator-modifiable resources groups based on the plurality of ranges of resources.

2. The method of claim 1 wherein an action from the actions is transformed into a permission level from a set of permission levels.

3. The method of claim 2 wherein the set of permission levels includes a read permission and a write permission.

4. The method of claim 2 wherein the action is transformed into a permission level based on frequency of the action.

5. The method of claim 1 wherein the access data is received from access logs.

6. The method of claim 1 wherein the clusters are formed with biclustering.

7. The method of claim 1 wherein a range of users of the plurality of ranges of users includes one user.

8. The method of claim 1 in which each user of the plurality of users is included in one or more security group.

9. The method of claim 1 in which each resource of the plurality of resources is included in one or more resources group.

10. The method of claim 1 wherein the administrator-modifiable security groups are automatically deployed into an access control service.

11. A computer readable storage device to store computer executable instructions to control a processor to:

receive access data including a plurality of users, a plurality of resources, and actions the plurality of users performed on the plurality of resources into a matrix of the plurality of users and the plurality of resources from a data gathering over a period of time of permission levels;

assign an expected permission level for each resource of the plurality of resources to each user of the plurality of users based on actions of the each user with respect to each resource from the access data selected from a plurality of permission levels available for access over the period of time, wherein the expected permission level is a more restrictive permission level than a least restrictive permission level of the plurality of permission levels available for access;

form clusters of the matrix to produce a plurality of ranges of the users and a plurality of ranges of the resources from the expected permission level for each resource;

assign a permission level from a set of permission levels to each of the clusters based on the access data of the actions, the access data of the actions corresponding with the set of the permission levels; and create administrator-modifiable security groups based on the ranges of users and administrator-modifiable resources groups based on the ranges of resources.

12. The computer readable storage device of claim 11 wherein the matrix is provided in a data structure included in the computer readable device.

13. The computer readable storage device of claim 11 wherein the access data is received from access logs of a cloud tenant into fields.

14. The computer readable storage device of 11 wherein the clusters are formed with a biclustering machine.

15. The computer readable storage device of claim 11 wherein the administrator modifiable security groups and resources groups include a recommended permission level from a set of permission levels.

16. A system, comprising:
a memory device to store a set of instructions; and
a processor to execute the set of instructions to:
  receive access data including a plurality of users, a plurality of resources, and actions the plurality of users performed on the plurality of resources into a matrix of the plurality of users and the plurality of resources from a data gathering over a period of time of permission levels;
  assign an expected permission level for each resource of the plurality of resources to each user of the plurality of users based on actions of the each user with respect to each resource from the access data selected from a plurality of permission levels available for access over the period of time, wherein the expected permission level is a more restrictive permission level than a least restrictive permission level of the plurality of permission levels available for access;
  form clusters of the matrix to produce a plurality of ranges of the users and a plurality of ranges of the resources from the expected permission level for each resource;
  assign a permission level from a set of permission levels to each of the clusters based on the access data of the actions, the access data of the actions corresponding with the set of the permission levels; and
  create administrator-modifiable security groups based on the ranges of users and administrator-modifiable resources groups based on the ranges of resources.

17. The system of claim 16 comprising:
an access control configuration manager.

18. The system of claim 17 wherein the access control configuration manager is included in a cloud environment.

19. The system of claim 18 wherein the access control configuration manager is implemented as an access control service in the cloud environment.

20. The system of claim 19 wherein the access control service includes a role based access control manager.

* * * * *